United States Patent
Straßer

(10) Patent No.: US 12,244,136 B2
(45) Date of Patent: Mar. 4, 2025

(54) METHOD FOR OPERATING AN ELECTRICAL CIRCUIT ARRANGEMENT COMPRISING AT LEAST ONE FIRST COMPONENT AND ONE SECOND COMPONENT, THE ELECTRICAL CIRCUIT ARRANGEMENT, AND A MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 124 days.

(21) Appl. No.: 18/073,418

(22) Filed: Dec. 1, 2022

(65) Prior Publication Data
US 2023/0178977 A1    Jun. 8, 2023

(30) Foreign Application Priority Data
Dec. 2, 2021  (DE) .......................... 102021131791.6

(51) Int. Cl.
*H02H 7/18*   (2006.01)
*H02H 7/085*  (2006.01)
*H02H 7/26*   (2006.01)

(52) U.S. Cl.
CPC ............ *H02H 7/18* (2013.01); *H02H 7/0858* (2013.01); *H02H 7/263* (2013.01)

(58) Field of Classification Search
CPC ........ H02H 7/18; H02H 7/0858; H02H 7/263; H02M 1/15; H02M 1/008; H02M 7/48; H02J 3/36; H02J 1/02; H02J 13/00016

USPC ....................................................... 361/23, 1
See application file for complete search history.

(56) References Cited

U.S. PATENT DOCUMENTS

| | | | | |
|---|---|---|---|---|
| 5,914,582 A | * | 6/1999 | Takamoto | B60L 3/0023 |
| | | | | 318/299 |
| 6,630,804 B2 | * | 10/2003 | Moriya | H02P 6/005 |
| | | | | 318/440 |
| 8,648,559 B2 | * | 2/2014 | Singh | B60L 15/20 |
| | | | | 318/400.42 |
| 2012/0235617 A1 | | 9/2012 | Singh | |

FOREIGN PATENT DOCUMENTS

| | | |
|---|---|---|
| CN | 102355195 A | 2/2012 |
| DE | 102015016704 A1 | 6/2017 |
| DE | 102016203044 A1 | 8/2017 |
| DE | 102018220809 A1 | 6/2020 |
| DE | 102019202335 A1 | 8/2020 |
| DE | 102019206667 A1 | 11/2020 |

(Continued)

*Primary Examiner* — David Luo
(74) *Attorney, Agent, or Firm* — Seed IP Law Group LLP

(57) ABSTRACT

A method for operating an electrical circuit arrangement comprising at least one first component and one second component, wherein the components are electrically connected across a direct current sub-grid of the electrical circuit arrangement, includes switching the first component at a first operating point with a first cycle time and switching the second component at a second operating point with a second cycle time, wherein the components are connected across a communication link and a phase position is determined and set between the first cycle time and the second cycle time as a function of fault information describing at least one present alternating voltage in the direct current sub-grid.

12 Claims, 1 Drawing Sheet

(56) References Cited

FOREIGN PATENT DOCUMENTS

| EP | 1912321 | A2 | 4/2008 |
|---|---|---|---|
| JP | 2007240450 | A | 9/2007 |
| JP | 2019106848 | A | 6/2019 |

* cited by examiner

METHOD FOR OPERATING AN ELECTRICAL CIRCUIT ARRANGEMENT COMPRISING AT LEAST ONE FIRST COMPONENT AND ONE SECOND COMPONENT, THE ELECTRICAL CIRCUIT ARRANGEMENT, AND A MOTOR VEHICLE

BACKGROUND

Technical Field

Embodiments of the invention relate to a method for operating an electrical circuit arrangement comprising at least one first component and one second component, wherein the components are electrically connected across a direct current sub-grid of the electrical circuit arrangement, wherein the first component is switched at a first operating point with a first cycle time and the second component is switched at a second operating point with a second cycle time.

Furthermore, embodiments of the invention relate to an electrical circuit arrangement as well as a motor vehicle.

Description of the Related Art

A component of an electrical circuit arrangement connected to a direct current sub-grid and having a switch element which is switched with a cycle time generates faults in the direct current grid in the form of voltage ripples. These voltage ripples constitute an alternating voltage, which superimposes a DC voltage in the direct current grid. The occurrence of such perturbing voltages is generally undesirable, since they may constitute a load on other components connected to the direct current sub-grid.

One common approach to reducing these faults is the use of a capacitor in the direct current grid to smooth out the voltage in the direct current grid or to filter the voltage ripples. However, such capacitors may be substantial in size and involve substantial manufacturing expense, especially in circuit arrangements which are designed to handle high electrical power, so that there is still a need for other methods of fault compensation, especially to suppress or filter out voltage ripples. Various solutions are known in the prior art for reducing of perturbing voltages due to switching components.

In JP 2007240450 A there is disclosed a circuit for detecting a worsening of a smoothing capacitor of an electronic device, wherein the smoothing capacitor is used for the filtering of voltage ripples. The circuit imposes on the smoothing capacitor a DC voltage including a pulsating current. Using a measurement device, a measurement value of a voltage ripple is compared to a calculated ripple value, in order to determine a worsening of the smoothing capacitor.

CN 102355195 A describes a circuit arrangement having multiple inverters which are interconnected with each other in order to achieve a synchronous switching operation of the inverters. The inverters are connected across a CAN bus, by which synchronization information is relayed between the inverters.

From JP 2019106848 A there is known a driver circuit for electrical machines. The driver circuit comprises two inverters for generating an alternating current for the operation of the electrical machines. By a control unit, the inverters are triggered each time with a different trigger signal, and a phase offset is set for at least one inverter for the triggering of another inverter. The control device determines the phase offset to be set in dependence on current measurement values each time describing the current flow between one of the inverters and an intermediate circuit capacitor associated with the particular inverter.

BRIEF SUMMARY

Some embodiments indicate an improved method for the suppressing of faults in an electrical circuit arrangement comprising at least two components, each operated with a cycle time.

Some embodiments include a method, wherein the components are connected across a communication link and a phase position is determined and set between the first cycle time and the second cycle time as a function of fault information describing at least one present alternating voltage in the direct current sub-grid.

Thus, it becomes possible, by means of the components communicating with each other, to set the phase position of the respective cycle times of the components as a function of fault information describing a present alternating voltage or a ripple voltage or fault in the direct current sub-grid. The phase position between the cycle times can thus be adapted to the faults presently occurring in the direct current sub-grid, as described by the fault information, so that a smoothing of the voltage in the direct current sub-grid can be achieved. The phase position can be determined from the fault information for example with the aid of an assignment rule or controlled or regulated as a function of fault information describing the present alternating voltage in the direct current sub-grid.

The components in particular each comprise a switch element, which is switched with the cycle time. In this way, the components generate perturbing voltages in the direct current sub-grid electrically interconnecting the components to each other. These perturbing voltages can be at least partly compensated by setting the phase position between the first cycle time and the second cycle time. This can be done, in particular, if the first cycle time and the second cycle time are triggered with the same frequency or frequencies differing by an integer multiple.

The components can be, in particular, inverters configured as a pulse inverter, each of which is used for the individual driving of an electric motor. The direct current sub-grid may comprise, in particular, an energy accumulator, which is designed to provide a direct current that is changed into an alternating current by the components configured as inverters for the operation of the electrical motors.

It is possible for the electrical circuit arrangement to comprise more than two components, each one being operated with a cycle time. In this case, a phase position can be set each time between the cycle times of a pair of components, so that on the whole a phase offset results between the cycle times of the components and an at least partial smoothing of the DC voltage in the DC voltage sub-grid is achieved.

The electrical circuit arrangement can be in particular an onboard network of a motor vehicle, especially a high-voltage onboard network, by which electrical traction motors of the motor vehicle that are connected to the components can be operated. Each time the components can be configured as traction inverters and in particular they can operate electrical machines associated each time with a different axle or a different wheel of the motor vehicle. Since different cycle times of the components may be present each time for a driving operation of a motor vehicle, in order to set different operating points depending on the axle or the wheel, a simple and easily implemented setting of the phase position is made possible by the communication link between the components for reducing of perturbing voltages in the direct current sub-grid.

Thanks to the possibility of compensating at least partly the ripple voltages occurring in the direct current sub-grid by the in phase position, it is possible to reduce the loading on other components of the electrical circuit arrangement that are located in the direct current sub-grid. In a circuit arrangement configured as an onboard network of a motor vehicle, these components may be, for example, a high-voltage battery, an air conditioning compressor, or other components operated through a high-voltage direct current sub-grid of a motor vehicle.

The at least partial compensation of the faults which occur has the advantage that other components which are present for smoothing the voltage in the direct current sub-grid, for example intermediate circuit capacitors which are part of the components, can be smaller and thus more cost-effective in design. Thus, the design space requirement of the components is reduced, which is especially advantageous when using the electrical circuit arrangement in a motor vehicle. Furthermore, the reduction of alternating voltage loads in a direct current sub-grid has the advantage of reducing the loads on components connected to the direct current sub-grid, especially energy accumulators such as a traction battery or the like. This helps improve the service life of these components.

It can be provided that the phase position is determined, in particular continuously or after a changing of the first operating point and/or the second operating point, so that the alternating voltage is reduced, in particular, minimized.

The phase position can be determined and set continuously, i.e., ongoing, so that a long-term state can be achieved in which the alternating voltage in the direct current sub-grid is reduced. By the setting of the phase position, the alternating voltage can have a minimum value or the alternating voltage faults generated each time by the components can be superimposed so that the mutually cancel each other.

In some embodiments, it can be provided that the fault information is determined as a function of at least one measurement value describing the present alternating voltage in the direct current sub-grid. For this, the circuit arrangement may comprise at least one measurement means with which a measurement value describing the alternating voltage in the direct current sub-grid can be detected.

The measurement means can be for example a voltage measurement means, which measures the voltage in the direct current sub-grid and can thus detect the alternating voltage as a superpositioning of a DC voltage in the direct current sub-grid. At least one measurement means can be associated with the direct current sub-grid and/or the components can each comprise a measurement means, so that the components can determine fault information each time.

It can be provided that the fault information is determined as a function of a first operating point which has been set or is to be set or a second operating point which has been set or is to be set. Upon determining the fault information, the phase position can thus be determined and set in dependence on the present operating points of the components. By using a first operating point to be set or a second operating point to be set, it becomes possible to determine the phase position already before or at the same time as the setting of the operating points, so that even in event of a switching of the operating points a further operation of the components is possible with the phase position determined as a function of the fault information.

It can be provided that the fault information is determined as a function of a cycle time which is to be set, as a function of at least one measured quantity describing a voltage of the direct current sub-grid and/or as a function of at least one quantity to be generated by the components, in particular a voltage to be generated and/or a current strength to be generated. With these quantities, it is possible to describe substantially the behavior of the respective component, especially a component configured as an inverter, or its respective operating point.

Taking into account the first operating point and the second operating point to determine the fault information has the advantage that in such a case the operating state of the components and thus the state of the direct current sub-grid can be calculated, so that the alternating voltage occurring as a fault in the direct current sub-grid can be calculated. In such a case, there is no need for a measurement means associated with the direct current sub-grid and/or the use of otherwise determined measurement values.

In some embodiments, it can be provided that the phase position to be set is determined by a control device of the first component, wherein a phase position information describing the phase position to be set is relayed via the communication link for setting the phase position to the second component. The control device of the first component can itself determine the fault information in dependence on which the phase position is determined. It is also possible for the control device of the first component to determine the phase position in dependence on further fault information, which is relayed to the control device of the first component for example from a control device of the second component. In this way, the control device of the first component can determine the phase position to be set between the cycle times of the first component and the second component.

In an electrical circuit arrangement comprising further components, each of which is switched with a cycle time, the control unit of the first component can thus also determine each time for the one or more further components a phase position, for example in relation to the cycle time of the first component, and transmit across the communication link corresponding phase position information describing the phase position to the further components, so that these cycle times can be operated accordingly with the determined phase position.

It can be provided that a synchronization signal for synchronizing the cycle times of the first component and the second component is relayed via the communication link. In this way, it can be ensured that the phase position set between the cycle times also continues to exist in the long term, thanks to the synchronized cycle time operation of the components. The synchronization signal can likewise be generated by the control device of the first component for example and be relayed to the second component or to other components of the direct current sub-grid, each operating with a respective cycle time.

The communication link can be a discrete communication line, a communication bus and/or a powerline communication. The powerline communication can occur, for example, through the lines of the direct current sub-grid. The discrete communication line can connect the first component directly to the second component and be configured as an electrical and/or optical line.

The use of a discrete communication line and/or a powerline communication via the direct current sub-grid has the particular advantage that no further communication participants are present and thus very fast transmission rates are easily possible, such as might be required for a synchronization of the cycle times.

A transmission of the synchronization signals is also possible across a communication bus, if the communication bus enables an adequate transmission rate. For example, the communication bus can be a CAN bus or another type of bus connection of a motor vehicle by which the first component and the second component can communicate.

It can be provided that the first component is configured as an inverter and/or the second component is configured as an inverter.

For an electrical circuit arrangement described herein it is provided that it comprises a first component, a second component and a control device, wherein the components are electrically connected across a direct current sub-grid of the electrical circuit arrangement, wherein the first component is switchable at a first operating point with a first cycle time and the second component is switchable at a second operating point with a second cycle time, wherein the components are connected across a communication link and the control device is adapted to carry out a method as described herein.

The control device described herein can be adapted to determine the phase position, in particular continuously or after a changing of the first operating point and/or the second operating point, so that the alternating voltage is reduced, in particular, minimized.

The control device described herein can be adapted to determine the fault information as a function of at least one measurement value describing the present alternating voltage in the direct current sub-grid.

In some embodiments, the control device can be adapted to determine the fault information as a function of a first operating point which has been set or is to be set and a second operating point which has been set or is to be set.

The control device can be adapted to determine the fault information as a function of a cycle time which is to be set, as a function of at least one measured quantity describing a voltage of the direct current sub-grid and/or as a function of at least one quantity to be generated by the components, in particular a voltage to be generated and/or a current strength to be generated.

The control device can be a control for the first component, wherein the control device is adapted to determine the phase position to be set and to relay phase position information describing the phase position to be set via the communication link for setting the phase position to the second component.

In some embodiments, it can be provided that a synchronization signal for synchronizing the cycle times of the first component and the second component can be relayed via the communication link.

The communication link described herein can be a discrete communication line, a communication bus and/or a powerline communication.

The first component and/or the second component can be configured as an inverter.

All of the advantages and embodiments described above in regard to the method described herein apply accordingly to the circuit arrangement described herein and vice versa.

For a motor vehicle as described herein it is provided that it comprises a circuit arrangement as described herein.

The advantages and embodiments described above in regard to the circuit arrangement described herein and the method described herein apply accordingly to the motor vehicle described herein, and vice versa.

BRIEF DESCRIPTION OF THE SEVERAL VIEWS OF THE DRAWINGS

Further advantages and details will emerge from the embodiments described below, as well as the drawings.

DETAILED DESCRIPTION

Figure 1:
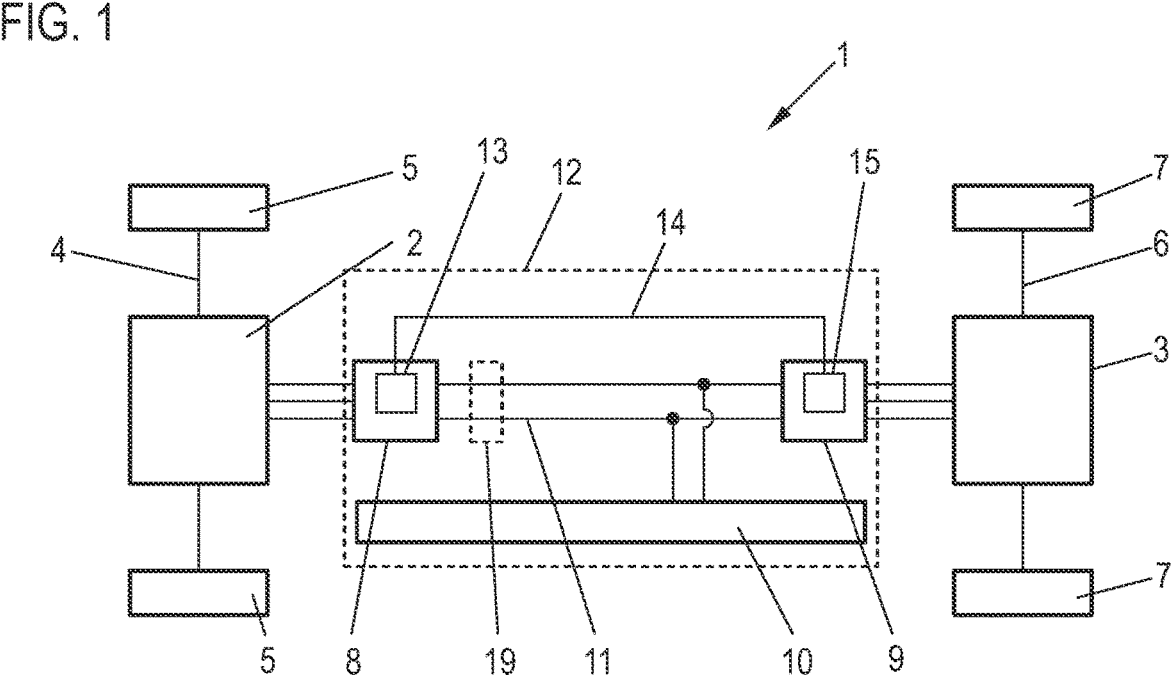
FIG. 1 shows an embodiment of a motor vehicle having an embodiment of an electrical circuit arrangement.

FIG. 1 shows an embodiment of a motor vehicle 1. The motor vehicle 1 comprises two electrical machines 2, 3, the electrical machine 2 being associated with a front axle 4 for the driving of front wheels 5. The second electrical machine 3 is accordingly associated with a rear axle 6 for the driving of rear wheels 7 of the motor vehicle 1. The electrical machines 2, 3 are connected mechanically to the respective wheels 5, 7 by the axles 4, 6 and also optionally by further mechanical components, such as a transmission.

The electrical machine 2 is operated by means of a first component 8 configured as an inverter. The second electrical machine 3 is operated accordingly by means of a second component 9 configured as an inverter. The components 8, 9 serve for converting a direct current, which is taken from an energy accumulator 10 of the motor vehicle 1. The direct current is transformed by the components 8, 9 into a multiphase, such as a three-phase, alternating current for the operation of the electrical machines 2, 3.

The components 8, 9 are connected across a direct current sub-grid 11 to each other, and the energy accumulator 10 may also be connected to the direct current sub-grid 11. Even further components of the motor vehicle 1 can be connected to the direct current sub-grid 11, such as an air conditioning compressor or the like.

The components 8, 9 as well as the direct current sub-grid 11 with the energy accumulator 10 and the further components which may be present form an electrical circuit arrangement 12 of the motor vehicle 1. The electrical circuit arrangement 12 forms a direct current onboard network of the motor vehicle 1.

The energy accumulator 10 may be, for example, a traction battery furnishing a high-voltage DC voltage, such as one between 200 V and 1000 V. Alternatively, the energy accumulator 10 may also furnish lower voltages below 200 V, such as 48 V or 60 V.

The components 8, 9 each comprise at least one switch element, such as a transistor. In particular, the components 8, 9 may each be configured as a pulse inverter and comprise multiple half-bridges composed of switch elements for the current transformation. In operation of the motor vehicle 1, the first component 8 switches at a first operating point with a first cycle time and the second component 9 at a second operating point with a second cycle time.

Due to the switching of the components 8, 9 with the first and the second cycle time, alternating voltages may arise in the direct current sub-grid 11, superimposing a DC voltage in the direct current sub-grid 11. These alternating voltages are also known as ripple voltages and they constitute faults which may place a load on the energy accumulator 10 as well as other components of the circuit arrangement 12 which might also be connected to the direct current sub-grid 11.

In order to reduce these alternating voltages, the electrical circuit arrangement 12 comprises a control device 13, which is designed to set a phase position between the first cycle time of the first component 8 and the second cycle time of the second component 9 in dependence on fault information describing a present alternating voltage in the direct current sub-grid 11. In the present instance, the control device 13 is a control device of the first component 8.

The first component 8 and the second component 9 are furthermore connected to each other across a communication link 14. The communication link may for example connect the control device 13 of the first component 8 to another control device 15 of the second component 9. The control device 13 may for example also take charge of the triggering of one or more switch elements of the first component 8 and for this it may contain a driver circuit, for example. Accordingly, a triggering of the at least one switch element of the second component 9 may also occur through the control device 15, especially through another driver circuit of the control device 15.

Figure 2:
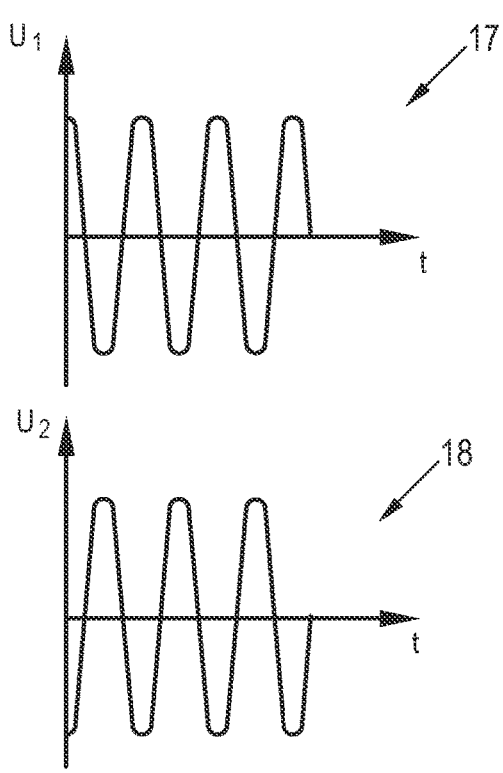
FIG. 2 shows two diagrams of an alternating voltage in the direct current sub-grid.

FIG. 2 shows schematically in a first diagram 17 the curve of a perturbing voltage $U_1$ generated by the first component 8. In the second diagram 18 there is shown the schematic curve of a perturbing voltage $U_2$ which is generated by the second component 9.

The perturbing voltages $U_1$ and $U_2$ are generated by the cycle times of the first component 8 and the second component 9 and superimpose the DC voltage as ripple voltages in the DC voltage sub-grid 11. In the present instance, the cycle time of the first component 8 and the second cycle time of the second component 9 have the same frequency, which also results in the same frequency for the perturbing voltages, for example. In order to reduce the ripple voltage load in the direct current sub-grid, a phase position or a phase offset of for example 180° is set between the first cycle time and the second cycle time, so that the voltages $U_1$ and $U_2$ are obviously destructively superimposed. Thus, the setting of the phase position can reduce and/or minimize or prevent the alternating voltage load in the direct current sub-grid.

The representation of the perturbing voltages $U_1$, $U_2$ in the diagrams 17, 18 is purely schematic. In particular, it is possible for the perturbing voltages generated respectively by the components 8, 9 to be composed of multiple frequency components, so that for example corresponding harmonics may also exist for a frequency corresponding to the respective cycle time of the component 8, 9.

Moreover, the perturbing voltages generated by the components 8, 9 may also have different variations, which are due for example to a different design of the components 8, 9, different frequencies of the respective cycle time and/or different settings of the operating points of the components 8, 9. In such a case, the phase position which is set may only achieve a partial cancellation or a partial reduction of the perturbing voltages.

The control device 13 can determine the phase position in particular continuously or after a changing of the first operating point and/or the second operating point of the components 8 and 9. The determining of the phase position is done such that the alternating voltage in the direct current sub-grid 11 is reduced, and in particular minimized. A minimum alternating voltage can be achieved, as has been illustrated in the preceding example, when the alternating voltage portions generated by the components 8, 9 are each entirely destructively superimposed.

The control device 13 can determine the fault information in dependence on the measurement value describing the present alternating voltage in the direct current sub-grid. For this, the control device 13 can be connected to a measurement device 19, which for example measures a voltage in the direct current sub-grid.

In addition or alternatively, it is possible for the control device 13 to determine the fault information in dependence on a first operating point which has been set or is to be set for the first component 8 and a second operating point which has been set or is to be set for the second component 9. The fault information can be determined, e.g., in dependence on a cycle time to be set each time, in dependence on a measured quantity describing the voltage of the direct current sub-grid 11 and/or in dependence on at least one quantity to be generated respectively by the components, in particular a voltage to be generated and/or a current strength to be generated. Such a determination of the fault information allows one to do without the measurement means 19 in the direct current sub-grid 11.

In particular, it is possible for the control device 15 of the other component 9 to determine itself the fault information in dependence on the operating point which has been set and/or is to be set and to transmit this to the control device 13 of the first component 8 across the communication link 14, so that the control device 13 of the first component 8 can determine the phase position on the basis of this fault information and fault information determined on the basis of the first operating point which is to be set or which has been set and which is known to the control device 13.

The phase position determined by the control device 13 can be set in particular by the control device 13 relaying phase position information describing the phase position via the communication link 14 an to the second component 9, in particular to the control device 15 of the second component 9. Furthermore, it is possible for a synchronization signal to be relayed for the synchronizing of the cycle times of the first component 8 and the second component 9 across the communication link 14. The synchronization signal can be determined for example by the control device 13 of the first component 8 and/or by the control device 15 of the second component 9 and be transmitted to the respective other component via the communication link 14.

The communication link 14 can be configured as a discrete communication line which connects the first component 8 to the second component 9. Alternatively, it is possible for the communication link 14 to exist via a communication bus, such as a CAN bus or the like, of the motor vehicle 1. Furthermore, it is possible for the communication link to be a powerline communication, especially using the lines of the direct current sub-grid 11. It is also possible for the communication link 14 to comprise multiple communication channels configured according to the above mentioned possibilities.

The reduction of the alternating voltage in the direct current sub-grid 11 has the effect that intermediate circuit capacitances, which are integrated for example in the components 8, 9, can be smaller and thus more cost-effective in design. A small design of the intermediate circuit capacitors furthermore makes possible a reduced size of the components 8, 9, so that their integration in the motor vehicle 1 is easier. Moreover, the cost savings due to the smaller size of the intermediate circuit capacitors is greater than the additional costs for the implementing of a control device for determination of the phase position, especially when one uses a control device of the components 8, 9 for this.

German patent application no. 10 2021 131791.6, filed Dec. 2, 2021, to which this application claims priority, is hereby incorporated herein by reference in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating an electrical circuit arrangement comprising at least one first component and one second component, wherein the components are electrically connected across a direct current sub-grid of the electrical circuit arrangement, the method comprising:
   switching the first component at a first operating point with a first cycle time; and
   switching the second component at a second operating point with a second cycle time,
   wherein the components are connected across a communication link and a phase position is determined and set between the first cycle time and the second cycle time as a function of fault information describing at least one present alternating voltage in the direct current sub-grid, and
   wherein the fault information is determined as a function of the first operating point which has been set or is to be set or the second operating point which has been set or is to be set.

2. The method according to claim 1, wherein the phase position is determined so that the alternating voltage is reduced.

3. The method according to claim 1, wherein the phase position is determined continuously or after a changing of the first operating point and/or the second operating point, so that the alternating voltage is minimized.

4. The method according to claim 1, wherein the fault information is determined as a function of at least one measurement value describing the present alternating voltage in the direct current sub-grid.

5. The method according to claim 1, wherein the fault information is determined as a function of a cycle time which is to be set, as a function of at least one measured quantity describing a voltage of the direct current sub-grid and/or as a function of at least one quantity to be generated by the components.

6. The method according to claim 5, wherein the quantity to be generated by the components is a voltage to be generated and/or a current strength to be generated.

7. The method according to claim 1, wherein the phase position to be set is determined by a control device of the first component, wherein a phase position information describing the phase position to be set is relayed via the communication link for setting the phase position to the second component.

8. The method according to claim 1, wherein a synchronization signal for synchronizing the cycle times of the first component and the second component is relayed via the communication link.

9. The method according to claim 1, wherein the communication link is a discrete communication line, a communication bus and/or a powerline communication.

10. The method according to claim 1, wherein the first component is configured as an inverter and/or the second component is configured as an inverter.

11. An electrical circuit arrangement, comprising:
    a first component,
    a second component, and
    a control device,
    wherein the components are electrically connected across a direct current sub-grid of the electrical circuit arrangement,
    wherein the first component is switchable at a first operating point with a first cycle time and the second component is switchable at a second operating point with a second cycle time,
    wherein the components are connected across a communication link, and
    wherein the control device, in operation:
      switches the first component at a first operating point with a first cycle time; and
      switches the second component at a second operating point with a second cycle time,
    wherein a phase position is determined and set between the first cycle time and the second cycle time as a function of fault information describing at least one present alternating voltage in the direct current sub-grid, and
    wherein the fault information is determined as a function of the first operating point which has been set or is to be set or the second operating point which has been set or is to be set.

12. A motor vehicle comprising an electrical circuit arrangement according to claim 11.

* * * * *